US012669368B2

(12) United States Patent  
Carreel

(10) Patent No.: US 12,669,368 B2  
(45) Date of Patent: Jun. 30, 2026

(54) WEIGHING SYSTEM WITH A PLURALITY OF DISPLAY MODES

(71) Applicant: Withings, Issy les Moulineaux (FR)

(72) Inventor: Eric Carreel, Issy les Moulineaux (FR)

(73) Assignee: WITHINGS, Issy les Moulineaux (FR)

( * ) Notice: Subject to any disclaimer, the term of this patent is extended or adjusted under 35 U.S.C. 154(b) by 306 days.

(21) Appl. No.: 18/501,393

(22) Filed: Nov. 3, 2023

(65) Prior Publication Data

US 2024/0175744 A1 May 30, 2024

(30) Foreign Application Priority Data

Nov. 24, 2022 (EP) ..................................... 22315298

(51) Int. Cl.  
*G01G 23/18* (2006.01)  
*G01G 19/44* (2006.01)

(52) U.S. Cl.  
CPC ............. *G01G 23/18* (2013.01); *G01G 19/44* (2013.01)

(58) Field of Classification Search  
USPC ........................................................... 177/1  
See application file for complete search history.

(56) References Cited

U.S. PATENT DOCUMENTS 8,263,881 B2 * 9/2012 Oseko ..................... G01G 21/22  
340/666  
8,475,367 B1 * 7/2013 Yuen ....................... G16H 50/30  
177/4

8,896,569 B2 * 11/2014 Yang ...................... G06F 3/0446  
345/173  
10,346,120 B2 * 7/2019 Cho ...................... H04N 21/431  
10,347,152 B2 7/2019 Lavi et al.  
2005/0247494 A1 11/2005 Montagnino  
2010/0049471 A1 2/2010 Gage et al.  
2014/0257741 A1 * 9/2014 Chupp ..................... G01G 9/44  
702/131  
2015/0277841 A1 * 10/2015 Lanier ..................... G06F 3/014  
345/428  
2018/0028094 A1 * 2/2018 Lee ....................... A61B 5/4023

FOREIGN PATENT DOCUMENTS

FR 3 131 521 A1 7/2023  
GB 2482379 * 2/2012 ............. G08C 17/02  
WO WO 20190000662 * 1/2019 ............. G01G 19/44

OTHER PUBLICATIONS

Extended European Search Report as issued in European Patent Application No. 22315298.4, dated Apr. 20, 2023.

* cited by examiner

*Primary Examiner* — John E Breene

(74) *Attorney, Agent, or Firm* — CUSHMAN PARTNERS, LLC

(57) ABSTRACT

A weighing system includes a measuring device configured to generate configuration data and measurement data, control circuitry configured to select a display mode based at least on the configuration data and a display device configured to apply the selected display mode to the measurement data.

20 Claims, 10 Drawing Sheets

Visible mode

Obsfuscated mode

Hidden mode time

Standby

Configuration period

Measurement period

Measurement display period

Additional configuration period

Additional measurement display period

WEIGHING SYSTEM WITH A PLURALITY OF DISPLAY MODES

CROSS-REFERENCE TO RELATED APPLICATIONS

This application claims priority to European Patent Application No. 22315298.4, filed Nov. 24, 2022, the entire content of which is incorporated herein by reference in its entirety.

FIELD

The present invention relates to a weighing system. The weighing system is in particular a so called "bathroom scale" or "personal scale". Such a scale is notably configured to measure the weight of a user standing on the weighing system.

BACKGROUND

Conventionally, the measured weight is numerically displayed on a screen arranged on the scale. However, many people are reluctant to know or view the measured weight, or do not wish other people to know their actual weight. For example, people changing their life habits could be discouraged to see their weight fluctuating up and down every day. This can lead to people avoiding weighing themselves during long periods of time which may be counterproductive for a healthy weight control.

To respond to this phenomenon, it has been proposed scales with non-numerical displays. In particular, such scales display a color relative to the measure weight, for example a green color if the weight is within a predetermined range or is according to a predetermined trend and a red color if the weight is outside the predetermined range or trend.

For example, US2010/049471 ("Gage") explains in detail the psychological theory pertaining to the sensitive subject of weigh measurement and suggested a zero-readout weight sensor device, along with different options to still convey the weight information to the user or the user's doctor.

For example, U.S. Pat. No. 10,347,152 ("Lavi") discloses a health and fitness management system which calculates a health index number. The system obtains a user's weight from a scale without a screen and the user is never informed of their weight, at least on the scale.

However, all these solutions are not flexible enough to handle the relationship of a user with his or her weight.

SUMMARY

Indeed, the inventors noticed that real life is often more complex than a situation in which a user always wants to know his or her weight or, at the opposite, a situation in which a user never wants to know his or her weight. For example, a user may want to know his or her weight most of the time but the day after a party or a hearty meal, or after returning from vacations, the user prefers not to know the direct consequence on his or her weight.

Another issue appears when several people are using the same scale at home. Each user may have a different psychological relationship with his or her weight. While a user of a home may want not to see displayed his or her weight, another user of the same home may want to see the numerical value of his or her weight. The reasons may be well-being related, as disclosed by Gage, or confidentiality related.

The same issue may exist for another physiological property such as fat mass percentage, body mass index (BMI), that the user may not want to see at some point.

An aspect of the disclosure is to provide a weighing system enabling a more sophisticated approach with respect to the display of a physiological property.

Aspects of the invention are defined in the claims.

To that end, an aspect of the disclosure relates to a weighing system comprising: a sensor device configured to generate configuration data during a configuration period and to generate measurement data during a measurement period, the measurement data being representative of a physiological state of the user; control circuitry configured to select a display mode among a plurality of available display modes, the selection being based at least on the configuration data, and a display device configured to apply the selected display mode to the measurement data during a measurement display period, the measurement display period following the configuration period.

Thanks to this weighing system, the sensor device generates configuration data used by the control circuitry to select a display mode. The display mode then activates the selected display mode applied to the measurement data generated by the sensor device. By identifying for example a load pattern such as getting on the scale with alternatively the left or the right foot, which may be performed by the user at each measure, for example at each weight measurement, the weighting system may switch the display mode for each measurement, for example displaying or not the measured weight. The user may therefore choose for each measurement which level of information relative to the measured physiological property he or she wishes to be displayed on the weighing system.

In an embodiment, the selection is based at least on an identification in the configuration data of a pattern amongst a plurality of predetermined patterns associated with the plurality of available display modes.

In an embodiment, the plurality of predetermined patterns, the plurality of display modes and their association being stored in the control circuitry.

In an embodiment, the configuration data is generated by the sensor device by an interaction of the user with the weighing system.

In an embodiment, the predetermined patterns include a spatial distribution of the configuration data.

In an embodiment, the predetermined load patterns include a spatial distribution of the load between the plurality of load sensors.

In an embodiment, the predetermined patterns include a spatial dissymmetry of the configuration data.

In an embodiment, the spatial dissymmetry is representative of a user stepping on the weighing system with the left foot first or the right foot first.

In an embodiment, the sensor device comprises a plurality of load sensors (e.g., load cells), each load sensor being configured to measure an associated load, wherein the spatial dissymmetry includes the detection by half or fewer of the load sensors of a load greater than a first predetermined threshold, the other half or more of the load sensors detecting a load lower than a second predetermined threshold.

In an embodiment, the predetermined patterns include a temporal distribution of the configuration data.

In an embodiment, the predetermined patterns are stored in the control circuitry.

In an embodiment, the configuration data include: load data, and/or bioimpedance data.

In an embodiment, the sensor device includes a load sensor (e.g., load cells) and a bioimpedance sensor (e.g., electrodes).

In an embodiment, the measurement data include: weight data, body composition data, bioimpedance data, ECG data, PWV data, nerve health data.

In an embodiment, the display device is configured not to display any information representative of the measurement data before the measurement display period.

In an embodiment, the plurality of display modes includes three different display modes.

In an embodiment, the available display modes are chosen among: a visible mode in which the display device is configured to display a numerical value of the measurement data; an obfuscated mode in which the display device is configured to display some information related to the measurement data, and a hidden mode in which the display device is configured to not display any information representative of the measurement data.

In an embodiment, the information representative of the measurement data is chosen among the group consisting of: a color representative of a numerical value of measurement data; a symbol, for example an emoji, representative of a numerical value of the measurement data, and a trend of the measurement data using previously obtained measurement data.

In an embodiment, the sensor device comprises a plurality of load sensors (e.g., cells), each load sensor being configured to measure an associated load.

In an embodiment, the predetermined patterns are predetermined load patterns.

In an embodiment, the display device is configured to further display, before the display period, an indicator of the repartition of loads applied on the sensor device, the indicator of the repartition of loads comprising for example at least an arrow pointing in the direction of the dissymmetry of the load.

In an embodiment, the sensor device includes a load sensor, wherein the control circuitry is configured to awaken the display device from a standby state when the sensor device detects a load greater than a predetermined awakening threshold for a predetermined awakening duration, the configuration period starting after each awakening of the display device from the standby state.

In an embodiment, the display device is further configured to display a configuration interface at the beginning of the configuration period, wherein the configuration interface is representative of the available display modes, the selected display mode being chosen during the configuration period with the configuration data.

In an embodiment, the control circuitry is configured to carry out, after the measurement display period, an additional configuration period, the control circuitry being configured to select a display mode for the display device based on additional configuration data generated during the additional configuration period.

In an embodiment, the control circuitry is configured to carry out the additional configuration period when the display mode is the hidden mode or the obfuscated mode.

In an embodiment, the control circuitry is configured to select a display mode among a plurality of display modes based on the identification of a pattern during the additional configuration period and wherein the display device is configured to selectively activate the selected display mode applied to the measurement data during an additional measurement display period following the additional configuration period.

In an embodiment, the weighing system is configured to communicate with an external device, the external device being a remote server or a personal device such a smartphone.

In an embodiment, the control circuitry is configured to receive from an external device customization data comprising mode data to change the available display modes.

In an embodiment, the control circuitry is configured to receive from an external device customization data comprising at least one of: association data to change the associations between the plurality of predetermined patterns and the plurality of display modes, and pattern data to change the predetermined patterns.

In an embodiment, the control circuitry is configured to receive from the external device an activation signal to selectively activate or deactivate the configuration period and select a default display mode when the configuration period is deactivated.

In an embodiment, the weighing system is configured to send the measurement data mode to the external device, regardless of the selected display mode.

In an embodiment, the control circuitry is configured to store a user profile associated with each user of the weighing system, the user profile including notably a height of the user and the sex of the user.

In an embodiment, the control circuitry is configured to select a display mode among the plurality of display modes of the display device based only on the configuration data.

In an embodiment, the control circuitry is configured to select a display mode among the plurality of display modes of the display device based on the configuration data and on a user profile.

In an embodiment, each user profile defines the plurality of available display modes, wherein the user profile further defines the association between the plurality of predetermined patterns and the plurality of available display modes.

In an embodiment, each user profile is associated with an activation/deactivation of the configuration period and to a default display mode when the configuration period is deactivated.

In an embodiment, the control circuitry stores a plurality of user profiles, the control circuitry being configured to detect, during a recognition period, a specific user standing on the weighing system and to select the associated user profile.

In an embodiment, the display device is configured not to display any information representative of the measurement data during the recognition period.

In an embodiment, the display device is configured to display some information that is not related to any user during the configuration period and/or the recognition period, for example a weather information.

In an embodiment, the recognition period follows the configuration period.

An aspect of the invention also concerns a method of display carried out by a weighing system as described above, the method comprising at least the following steps:

generating configuration data during a configuration period, generating measurement data during a measurement period, the measurement data being representative of a physiological state of the user, selecting a display mode among a plurality of available display modes, the selection being based at least on the configuration data, applying the selected display mode to the measurement data during a measurement display period, the measurement display period following the configuration period.

Another aspect of the invention also concerns a non-transitory computer-readable medium including a computer program comprising software instructions which, when executed by a computer, carry out a method of display as described above.

BRIEF DESCRIPTION OF THE DRAWINGS

These features and benefits of the invention will appear more clearly upon reading the following description, provided solely as a non-limiting example, and done in reference to the appended drawings, in which.

DETAILED DESCRIPTION

In the following description, the terms "horizontal" and "vertical" are defined relatively to a weighing system placed on a flat floor. When the weighing system is moved around by a user, the "vertical direction" as defined below may be different from the gravity direction. As illustrated on the Figures, a vertical axis Z, a longitudinal axis X and a transversal axis Y are defined. In normal use, the user stands along the vertical axis Z and the user's feet are positioned along the longitudinal axis Y of the weighing system.

Figure 1:
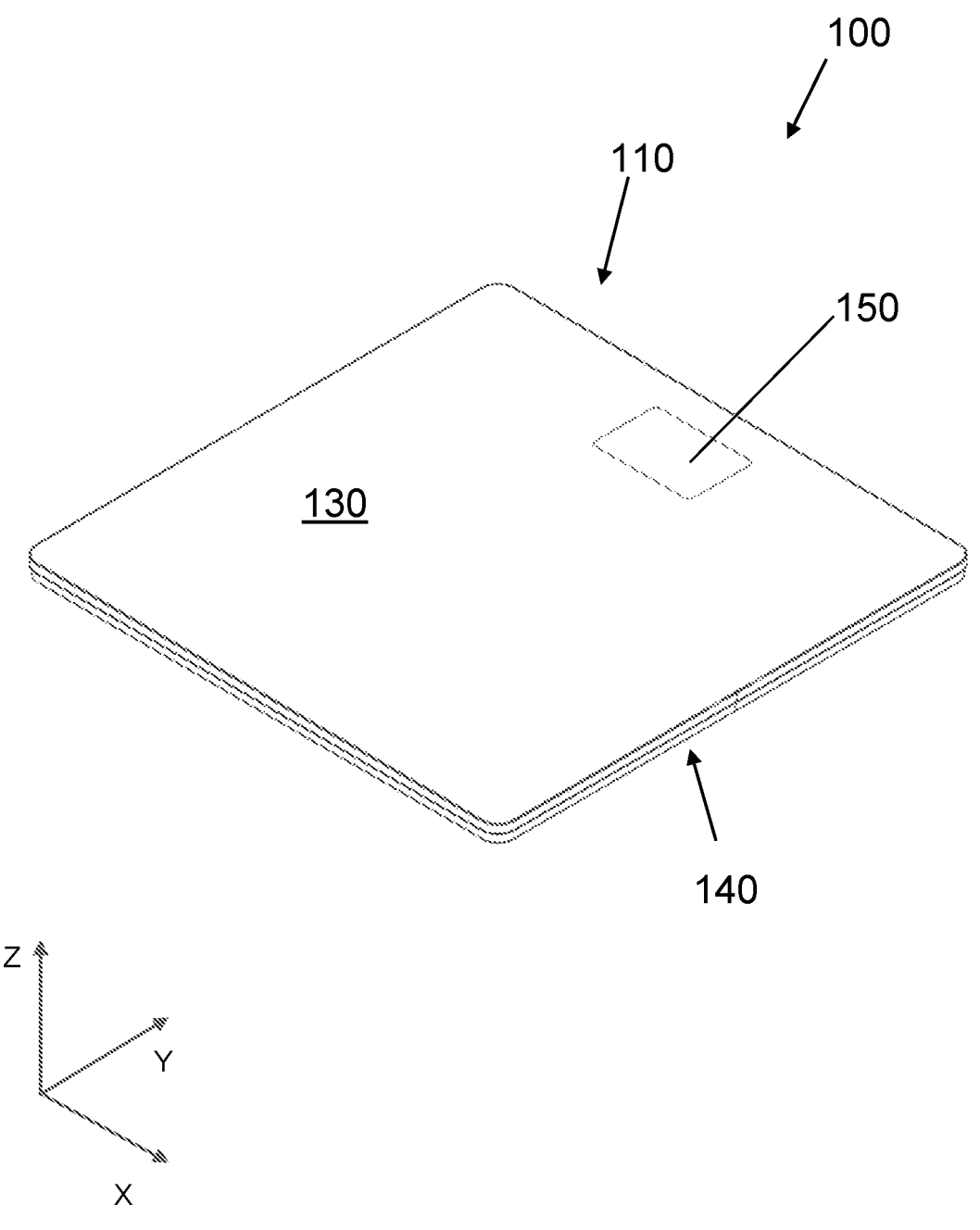
FIG. 1 shows a top perspective view along a foot axis of the weighing system according to the invention.

A weighing system 100 is represented on FIG. 1. In the illustrated example, this weighing system 100 is an electronic bathroom scale, or personal scale, on which a user can position himself or herself to measure a physiological parameter, notably his or her weight. In an embodiment, the weighing system 100 may also be configured to measure a body composition (bioimpedance analysis, BIA), an electrocardiogram (ECG), a Pulse Wave Velocity, a ballistocardiogram (BCG), a nerve health score, etc.

The weighing system 100 is configured to measure a weight, for example in the range between 5 kg and 300 kg, in particular within the range between 30 kg and 140 kg. Such a device is known as "bathroom scale", but it may obviously be used in a bedroom or in another room of a house.

The weighing system 100 comprises a main body 110. The main body 110 comprises an upper plate 130 and a bottom plate 140. Generally, there is no restriction as to the shape of the upper plate 130 and the bottom plate 140. The two plates 130, 140 may be both of the same or similar shape, or in some embodiments they may also be of different shape, the shapes being for example one of a circle, a rectangle, a hexagon or even an asymmetrical or irregular shape such as rhombic shape or similar. The upper plate 130 and the bottom plate 140 may have the same shape, but one of them may be larger than the other. In an exemplary embodiment displayed on FIG. 1, both the upper plate 130 and the bottom plate 140 have a square shape with rounded corners, where both squares are having sides of the same size. In this embodiment, the upper plate 130 is positioned such that when viewed from the top, it overlaps the bottom plate 140.

The thickness of the upper plate 130 and the bottom plate 140, and the distance between them, are chosen such that the overall thickness of the weighing system 100 along the foot direction Z does not exceed 25 mm. In some embodiments, the thickness of the weighing system 100 may be beneficially reduced to less than 20 mm, such as less than 18 mm. The upper plate 130 and the bottom plate 140 form a housing, the housing defining an internal volume.

The main body 110 includes a display device 150 to display information to the user. The display device 150 may be a screen (LCD, LED, electronic, e-ink display). By screen it is meant a dynamic interface configured to (i.e. constructed and arranged to) display alphanumerical or graphical information to the user.

As will be explained further below, the display device 150 is configured to apply a display mode among a plurality of predetermined display modes to at least measurement data generated by the weighing system 100. The plurality of predetermined display modes corresponds to a plurality of ways to display the measurement data to the user. The display modes are stored in the weighing systems. More details will be given below.

To save energy, the display device 150 is configured to switch from a standby state, in which the display device 150 is switched off, to an awaken state in which the display device 150 is switched on.

The display device 150 may be configured to further display, in any predetermined display mode, an indicator of the repartition of loads applied on the weighing system 100 to enable a better weighing measurement. The indicator is for example one or several arrows pointing in the direction of a dissymmetry of loads on the upper plate.

Figure 2:
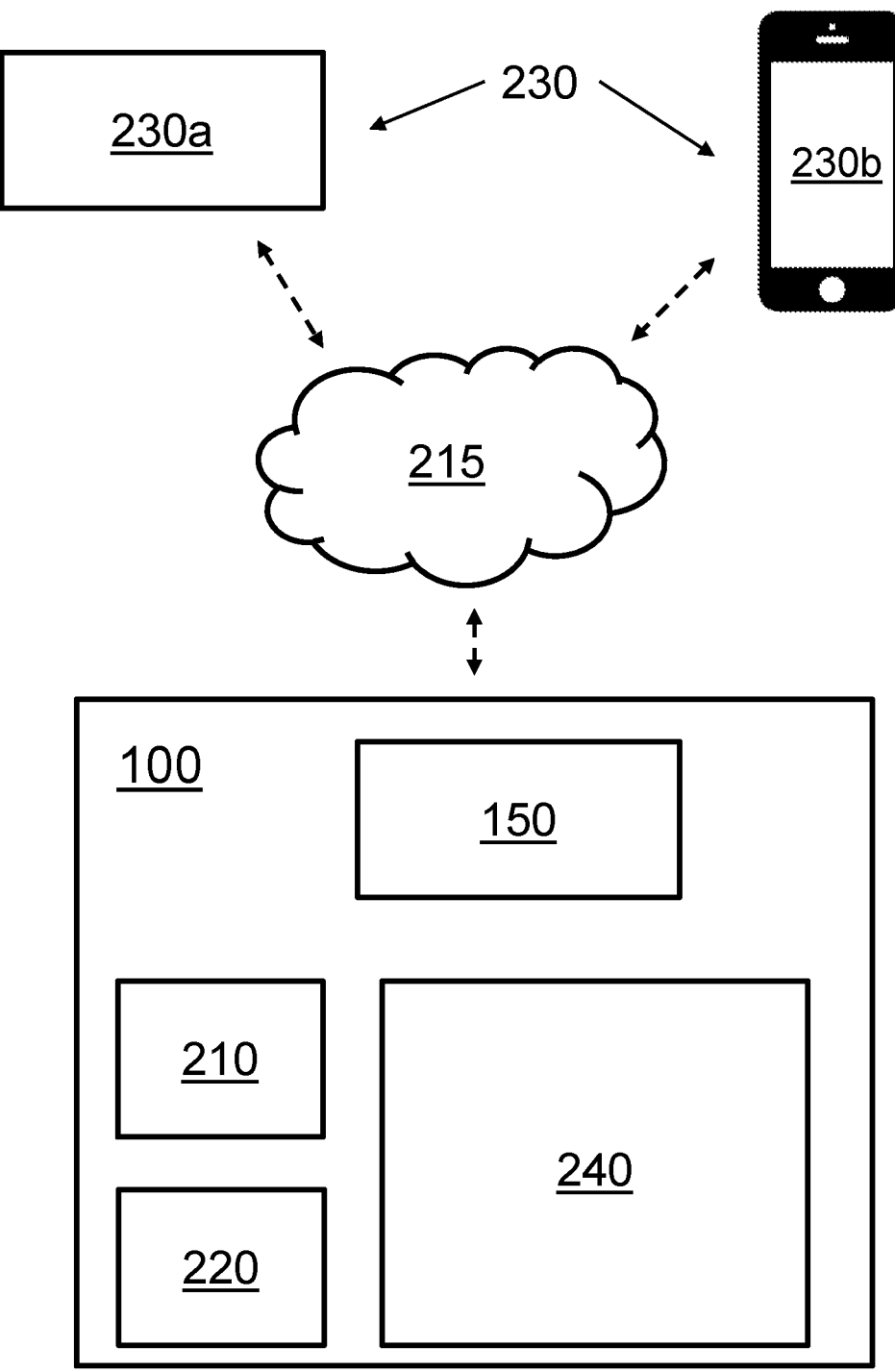
FIG. 2 shows a schematical view of the weighing system of FIG. 1 communication with external devices.

Referring to FIG. 2, the weighing system 100 further comprises control circuitry 210 arranged inside the internal volume with a processor and memory, and an input/output (I/O) interface, which, among other things, allows the control circuitry to receive and send data from and to a communication network 215. The processor is configured to, among other things, process data obtained by sensors of the weighing system 100. The control circuitry 210 and other electronic components may be mounted on a printed circuit board (PCB), which is attached to the top plate 130, for example.

The control circuitry 210 may store a user profile associated with each user of the weighing system 100. The user profile may include a height of the user and the sex of the user. In addition, to automatically recognize the user, the user profile may include the weight of the user. This weight may be the latest measurement or an average of the latest measurements. These data of the user profile are used to compute the body mass index (BMI) and the body composition of the user. The weighing system 100 further comprises a battery 220 (e.g., rechargeable) arranged inside the internal volume configured for supplying power to the various components of the weighing system 100.

The weighing system 100, and in particular the input/output (I/O) interface, may communicate with at least an external device 230 via the communication network 215, which may include a wireless network (in particular a network compatible with at least one of the following communication protocols: Bluetooth® (a short-range wireless technology standard), Wi-Fi, cellular, etc.). The external devices 230 may include a server 230a and/or a mobile terminal 230b (smartphone, etc.). The weighing system 100 may communicate with the server 230a and/or the mobile terminal 230b. In one implementation, the weighing system 100 may communicate directly with the mobile terminal 230b, for example via Bluetooth® or Bluetooth® Low Emission (BLE). This communication may be implemented at the installation of the weighing system 100, in particular to pair it with the mobile terminal 230b and/or to configure a connection to the server 230a that does not transit through the mobile terminal 230b and/or as a backup for a failed communication with the server 230a. In an embodiment, the weighing system 100 may communicate directly with the server 230a, without transiting through the mobile terminal 230b. This communication allows the user to use the weighing system 100 even without having the mobile terminal 230b nearby.

Control circuitry 210 stores the plurality of display modes. This allows the weighing system to operate the several embodiments of the description without communicating with the external device.

The weighting system 100 further comprises a sensor device 240. The sensor device 240 is configured to generate several data, as it will be further explained below, such as configuration data and measurement data. By data generation, it is understood the measurement of a physical property relative to the user, in particular the measurement of a physical property over space and/or over time.

In an embodiment, the sensor device 240 comprises weight sensors. The weight sensors are positioned between the upper plate 130 and the bottom plate 140 (in so-called "sandwich" architecture) or, in a variant, between the upper plate 130 and feet, not shown, (in a so-called "foot" architecture). The weight sensors may be load cells (typically four) that provide a weight, and thus a mass of a user.

Two structural groups are defined that move relative to each other: the feet (in the foot architecture) or the bottom plate 140 (in the sandwich architecture) on the one hand (fixed group), and everything else on the other hand (moving group). The load cells mechanically connect these two groups. In particular, each load cell is mechanically placed between the upper plate 130 and the fixed group (an associated foot or a portion of the bottom plate 140), so that the weight of the user is transmitted to the fixed group via the load cells, hereby generating a weight measure upon deformation of the load cell. To that end, in a known way, each load cell comprises a deformable portion, the deformation of which being linked to the strain applied thereto, that is to say the weight the user. In an embodiment, each load cell may include two strain gauges, in particular a first element whose resistance increases under the effect of vertical compression applied to the foot in question and a second element whose resistance decreases under the effect of the vertical compression.

The sensor device 240 may further comprise other sensors, such as an ECG sensor, an impedance sensor, a BCG sensor, a sweat sensor. Those sensors are known and are described in detail in, for example, document FR2114739. However, this is not limiting. It will be appreciated that other sensors known to one skilled in the art could be part of the sensor device 240.

The control circuitry 210 is configured to switch the display device 150 into a standby state when the sensor device 240 detects a load below a predetermined standby threshold for a predetermined standby duration, for example under 2 kg during 2 s in an embodiment. However, this is not limiting. It will be appreciated that the predetermined standby threshold and the predetermined standby duration can vary in other embodiments. The control circuitry 210 is configured to awaken the display device 150 by switching it to the awaken state when the sensor device 240 detects a load greater than a predetermined awakening threshold for a predetermined awakening duration, for example over 2 kg during more than 1 s in an embodiment. However, this is not limiting. It will be appreciated that the predetermined awakening threshold and the predetermined awakening duration can vary in other embodiments.

The sensor device 240 is configured to generate measurement data during a measurement period and configuration data during a configuration period.

Measurement data are data generated by an interaction of the user with the weighing system 100, in order to obtain a physiological state about his or her body (e.g., weight, fat mass, nerve health activity, BCG, etc.). This typically corresponds to well-known weight measurement. During the measurement period, the user usually stands still on the weighing system 100, so that the sensor device 240 may correctly generate the measurement data. The measurement data is configured to be displayed, during a measurement display period, by the display device 150 according to a display mode among the plurality of available display modes. In other words, during the measurement period, the user usually needs to be still and passive for the measurement data to be properly generated by the sensor device 240.

Configuration data are data generated by an interaction of the user with the weighing system 100, in order to choose or select a display mode for the measurement data. The choice or selection is carried out amongst a plurality of available display modes that are stored in the control circuitry 210 (e.g. a memory of the control circuitry). During the configuration period, the user's behavior on the weighing system 100 affects the configuration data and therefore enables him or her to choose a display mode for the measurement data. In other words, during the configuration data, the user needs to be active for the configuration data to be properly generated by the sensor device 240. Using the configuration data, the control circuitry 210 selects a display mode.

The measurement display period, during which the measurement data are displayed to the user with the selected display mode, occurs after the configuration period. This enables the user to choose the display modes before the measurement display period starts (that is to say the time window during which the users normally see a numerical value of the measurement data).

The Pattern Embodiment

A first embodiment (called "the pattern embodiment") of the weighing system 100 will now be described in reference to FIGS. 3 to 5.

In an example of the pattern embodiment, the configuration data are load data and the sensor device 240 includes load sensors, such as load cells, to generate load data. In another example of the pattern embodiment, the configuration data are impedance data and the sensor device 240 includes impedance sensors, such as electrodes (and the associated electronics: voltage or current generators, voltmeter, etc.).

Figure 3:
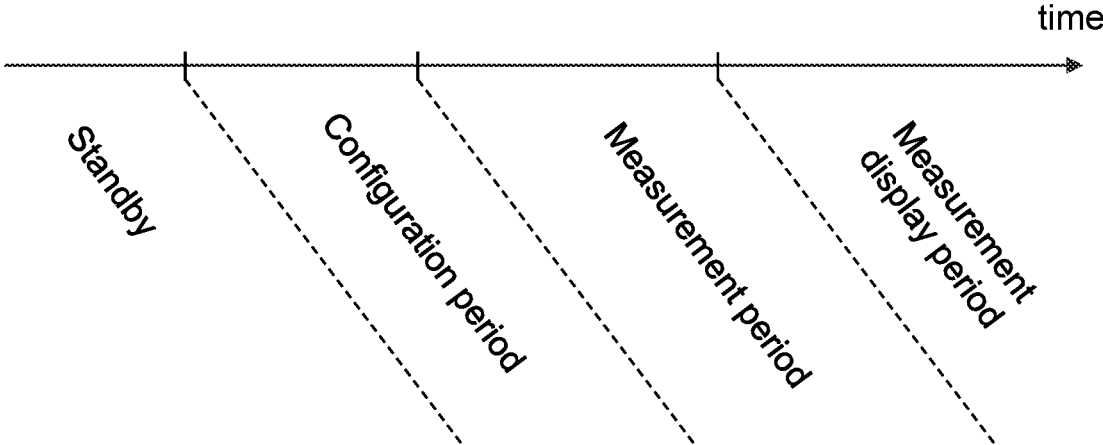
FIG. 3 shows a schematic timeline of an operation of the weighing system of FIG. 1 according to an embodiment of the description.

Referring to FIG. 3, the configuration period is beneficially carried out following each awakening of the display device 150 from the standby state. The configuration period is a period lasting for example less than 5 s, notably less than 2s. However, this is not limiting. The configuration period can vary and or be adjusted in other embodiments of the invention.

As mentioned above, the control circuitry 210 is configured to select a display mode among a plurality of available display modes, based at least on the configuration data. The selection may be based only on the configuration data.

In particular, the selection of the display mode is based at least on an identification in the configuration data of a pattern amongst a plurality of predetermined patterns associated with the plurality of available display modes. By "pattern", it is understood a particular spatial and/or temporal structure, organization, distribution or arrangement of the configuration data, that may be repeatable. One of the display modes (called the default display mode) may be associated with an absence of identification of a predetermined pattern.

By spatial, it is meant depending on the position or the movement of the user on the upper plate 130 of the weighing system 100; it will be appreciated that, such position may evolve over time. By temporal, it is meant the movement of the user on the upper plate 130. A pattern thus provides a simplified representation of a specific user behavior, such as a stepping on the weighing system 100, as it will be further explained below. For example, in an embodiment, the measurement of the physical property relative to the user over space that forms at least part of the configuration data corresponds to a spatial distribution of measured values of the physical property during the configuration period, and the measurement of the physical property relative to the user over time that forms at least part of the configuration data corresponds to a temporal distribution of the measured values of the physical property during the configuration period.

The predetermined patterns and their association with their respective available display modes are stored in the control circuitry 210. As mentioned previously, the plurality of available display modes is also stored in the control circuitry 210. In this pattern embodiment, the predetermined patterns and the plurality of display modes may be stored permanently in the control circuitry 210.

For example, the control circuitry 210 is configured to compare the configuration data to each of the predetermined patterns.

The comparison may comprise determining a distance (according to metric) between the configuration data and each of the predetermined patterns. The control circuitry 210 may identify the predetermined pattern with the lowest distance and selects the display mode associated with the identified predetermined pattern.

The comparison may comprise comparing the configuration data with one or more thresholds forming the predetermined patterns. The control circuitry 210 may identify the predetermined pattern based on the one or more threshold comparisons and select the display mode associated with the identified predetermined pattern.

In this pattern embodiment, the measurement period follows the configuration period, as illustrated on FIG. 3. The measurement data may be weight data of the user. The weight measurement is then carried out by the load cells.

In a variant or in complement, the measurement data may be: body composition data, bioimpedance data, ECG data, PWV data, nerve health data.

Spatial Distribution for the Predetermined Patterns

The predetermined patterns may cover a spatial distribution of the configuration data on the upper plate 130. For example, the predetermined patterns may be configured to distinguish a user stepping with the left foot or the right foot first on the upper plate 130 of the weighing system 100 during the configuration period (called "left foot first" pattern or "right foot first" pattern in the rest of the description). The control circuitry 210 identifies in the measurement data a pattern amongst the plurality of predetermined patterns and then selects the display modes associated with the identified predetermined pattern.

In an implementation, the predetermined patterns cover a spatial dissymmetry of the configuration data during the configuration period.

Predetermined Load Pattern

In an example of this embodiment, the predetermined patterns may be predetermined load patterns distributed over space. In particular, a load pattern is here a spatial distribution of the load between the plurality of load sensors. As each load sensor is able to measure a load, the load pattern is representative of a predetermined load repartition between the load sensors. The load pattern notably includes a spatial dissymmetry of the load between the plurality of load sensors during the configuration period. For example, the dissymmetry is the detection by half of the load sensors of a load greater than a first predetermined threshold, the other half of the load sensors detecting a load lower than a second predetermined threshold (half for an even numbers of load sensors, otherwise the number rounded up and rounded down).

Concretely, the dissymmetry may be representative of a user stepping on the weighing system 100 with the left foot (or alternatively with the right foot). In this case, the load sensors located on the left side (or alternatively on the right side) detect a load due to the user stepping on and the load sensors located on the other side do not detect any load. The control circuitry 210 is configured to detect this dissymmetry, to associate it to a predetermined pattern and to select the associated display mode. For example, if the control circuitry 210 detects that the user stepped on the weighing system 100 with the right foot, the control circuitry 210 selects a first display mode. If the control circuitry 210 detects that the user stepped on the weighing system 100 with the left foot, the control circuitry 210 selects another display mode. Thus, in these two embodiments (right foot or left foot embodiment), there is a spatial organization or arrangement of the detected loads that form a pattern of configuration data.

Figure 4:
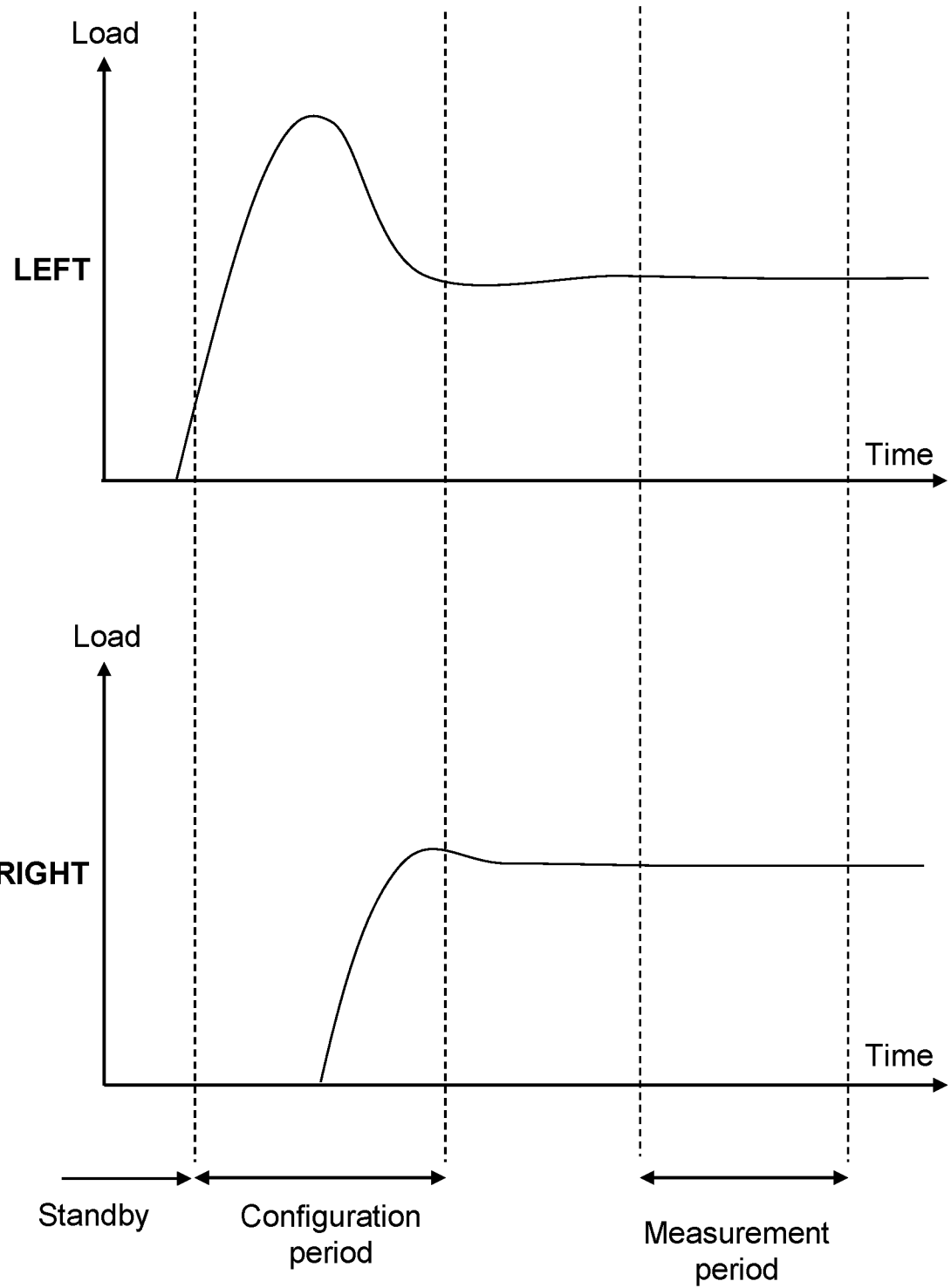
FIG. 4 illustrates an example of a load distribution over time respectively on the left side (top chart) and the right side (bottom chart) of the weighing system, according to an embodiment of the description.

FIG. 4 illustrates the load versus time evolution on respectively the left side and the right side of the sensor device 240. As visible on the two graphs of FIG. 4, the device display 150 is in standby mode when no load is applied on the weighing system 100. Then, when the user steps with his or her left foot first on the weighing system 100, the left side of the sensor device 240 detects the applied load and the display device 150 is awaken. Then, during the configuration period, the control circuitry 210 detects a difference of loads between the left and the right sides of the upper plate 130. In particular, the control circuitry 210 detects a difference of load greater than a predetermined threshold, for example 30 kg, during a predetermined period, for example 2s. The control circuitry 210 detects therefore the pattern associated with a user stepping on the weighing system 100 with the left foot and selects the associated display mode. Then, the sensor device 240 measures the weight of the user in a conventional way in order to generate the measurement data.

Predetermined Impedance Pattern

In another example of this embodiment, the predetermined patterns are impedance patterns. In particular, an impedance pattern is here a spatial distribution of the impedance between the impedance sensors. As each impedance sensor is able to measure an impedance, the impedance pattern is representative of a predetermined impedance repartition between the impedance sensors. The load pattern notably includes a spatial dissymmetry of the impedance between the plurality of impedance sensors during the configuration period. For example, the dissymmetry is the detection by half of the impedance sensors of an impedance lower than a first predetermined threshold, the other half of the impedance sensor detecting an impedance higher than a second predetermined threshold.

Concretely, the impedance sensors include two impedance sensors, one for each foot (as implemented on any impedance scale). The dissymmetry may be representative of a user stepping on the weighing system 100 with the left foot (or alternatively with the right foot). In this case, the impedance sensor located on the left side (or alternatively on the right side) detects an impedance due to the user stepping on and the impedance sensor located on the other side does not detect any impedance. The control circuitry 210 is configured to detect this dissymmetry, to associate it to a predetermined pattern and to select the associated display mode. For example, if the control circuitry 210 detects that the user stepped on the weighing system 100 with the right foot, the control circuitry 210 selects a first display mode. If the control circuitry 210 detects that the user stepped on the weighing system 100 with the left foot, the control circuitry 210 selects another display mode.

Temporal Distribution for the Predetermined Patterns

The predetermined patterns may cover a temporal distribution of the configuration data on the upper plate 130. For example, the predetermined pattern may be configured to distinguish a load variation in time (for example a tapping pattern or a knee flexion on the upper plate).

In an implementation, the predetermined patterns may be predetermined load patterns distributed over time. The predetermined patterns here may be representative of an evolution of the load during time regardless of the spatial distribution of the load (therefore not a right/left dissymmetry of loads as above).

Figure 5:
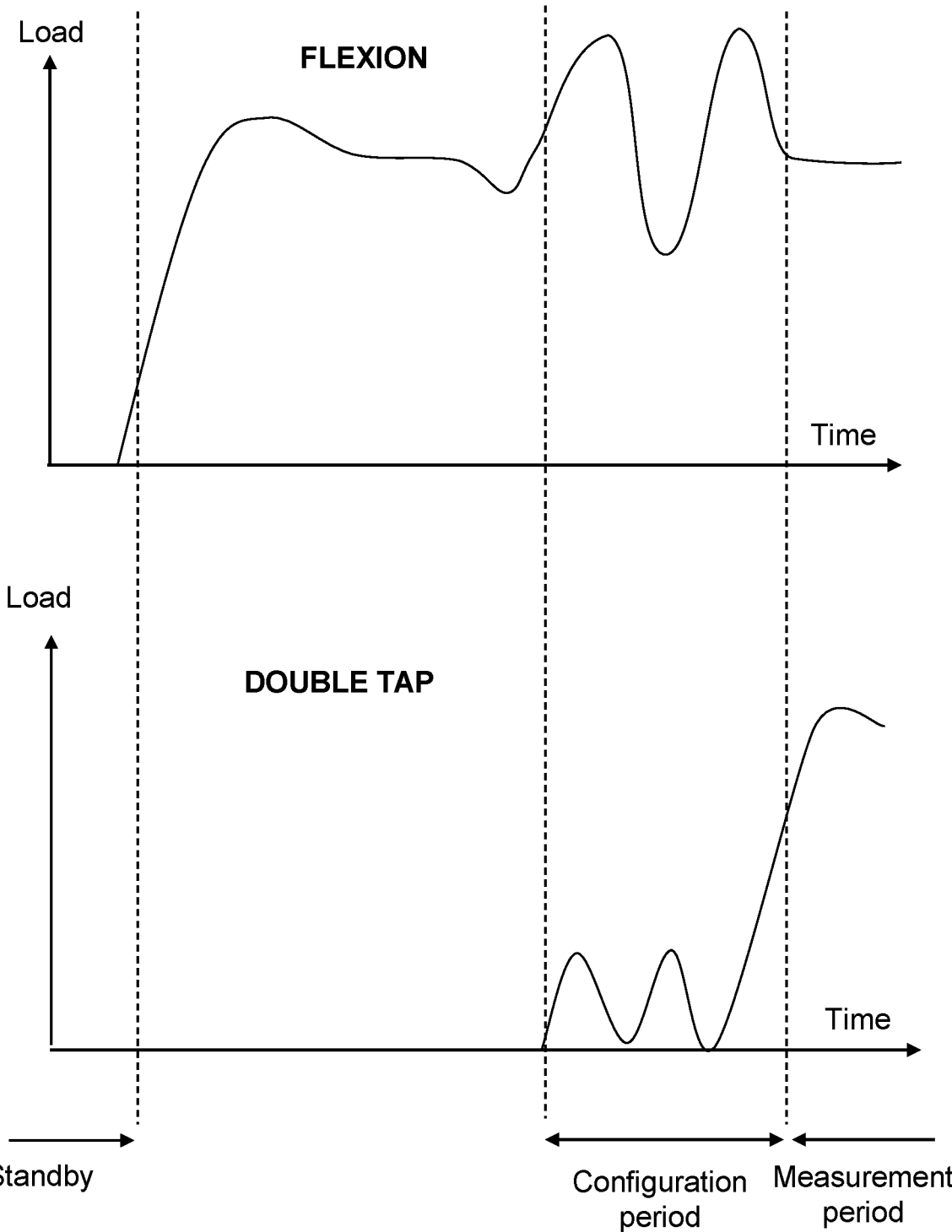
FIG. 5 illustrates another example of a load distribution over time respectively on the left side (top chart) and the right side (bottom chart) of the weighing system, according to an embodiment of the description.

For example, as illustrated on FIG. 5 ("FLEXION") a predetermined pattern may be a flexion (two flexions on FIG. 5) with knees done by the user on the upper plate 130 after stepping on the weighing system 100. The predetermined patterns could include any of one or two flexions. As visible on FIG. 5, the device display 150 is in standby mode when no load is applied on the weighing system 100. Then, when the user steps with his or her left foot first on the weighing system 100, the weighing system 100 detects the applied load and the display device 150 is awaken. Then, during the configuration period, the control circuitry 210 detects a double flexion made by the user. In particular, the control circuitry 210 may detect two peaks of loads by comparison with a predetermined threshold (e.g., above a certain variation of the weigh). The control circuitry 210 detects the predetermined pattern associated with a user double flexing on the weighing system 100 and selects the associated display mode. Then, the sensor device 240 measures the weight of the user in a conventional way in order to generate the measurement data.

In a variant, as illustrated on FIG. 5 ("DOUBLE TAP"), a predetermined pattern may be a tap (double tap on FIG. 5) with a foot done by the user on the upper plate 130 before stepping on the weighing system 100: during the configuration period, the control circuitry 210 detects a double tap made by the user. In particular, the control circuitry 210 may detect two small peaks of loads by comparison with threshold (for example between two predetermined thresholds). The control circuitry 210 detects the predetermined pattern associated with a user double taping on the weighing system 100 and selects the associated display mode. If not taping is detected, then no predetermined pattern is identified and therefore the default display mode may be selected (e.g., the visible mode) The double tap may be done by the user indifferently on the right side, the left side or on the center of the upper plate 130.

For example, instead of a double tap, the predetermined patterns may include different durations of a single tap, or different durations for any tap of a double tap.

Temporal and Spatial Distribution for the Predetermined Patterns

The predetermined patterns may cover a temporal and spatial distribution of the configuration data on the upper plate 130. This allows for more predetermined patterns, as for example they may include the following: left foot first, right foot first, left double tap, right double tap, left tap then right tap, right tap then left tap, etc.

The Configuration Interface Embodiment

Figure 6:
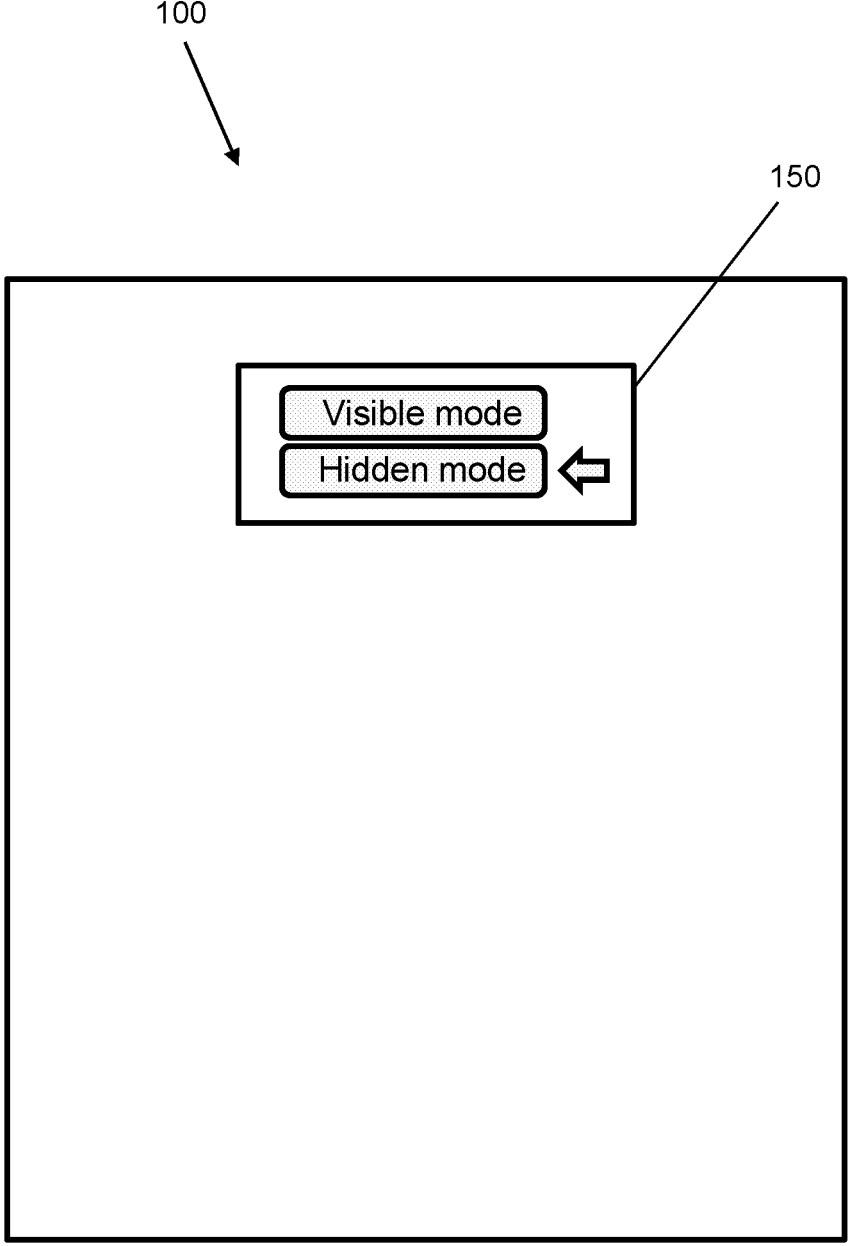
FIG. 6 shows a schematic representation of a configuration display, according to an aspect of the description.

A second embodiment (called "the configuration interface embodiment") of the weighing system 100 will now be described in reference to FIG. 6.

The display device 150 is configured to display a configuration interface before the measurement display period. The configuration interface indicates the available display modes to the user. In FIG. 6, the configuration interface shows that two display modes are available: the visible mode and the hidden mode. The configuration period is carried out following the display of the configuration interface. The selected display mode is chosen during the configuration period with the configuration data. It is understood that in this variant, there is no pattern recognition carried out by the control circuitry 210. The selection may be made by the user by moving its center of mass to the right or to the left, the load cells detecting this center of mass offset. This may lead to an arrow pointing the selected display mode as illustrated on FIG. 6. The selection may be based only on the configuration data.

The configuration period may here be prior to the measurement period. The user selects the desired display mode and then the sensor device 240 generates the measurement data.

In a variant, the configuration period may follow the measurement period. The user may first weight himself or herself and then select the display mode. The display device 150 is then configured not to display any information related to the measurement data of the user during the configuration period. For example, the display device 150 may display a message as "measurement in progress", a symbol as an hourglass, a weather forecast or even a black screen.

The Display Modes

The display device 150 is configured to apply the selected display mode to the measurement data. The display mode is operated during a measurement display period following the configuration period, as illustrated on FIG. 3.

In an aspect, the plurality of display modes includes only two different display modes. In a variant, the plurality of display modes includes three different display modes.

Figure 7:
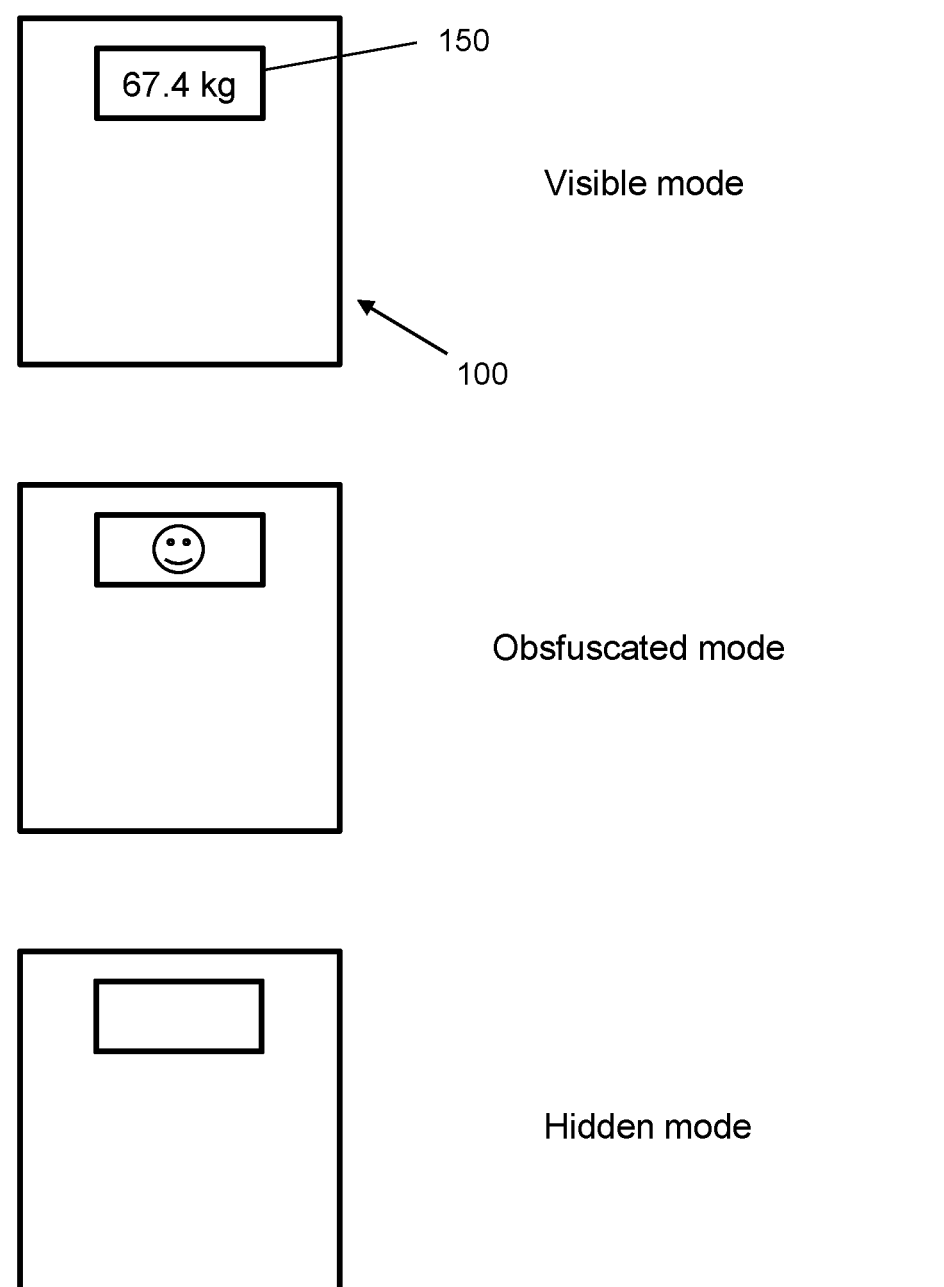
FIG. 7 shows a schematic representation of three available display modes.

In particular, as illustrated of FIG. 7, each display mode is chosen among a visible mode, an obfuscated mode, and a hidden mode.

In the visible mode, the display device 150 is configured to display the numerical value of the measurement data during the measurement display period. The visible mode corresponds to the "conventional" mode of a "conventional" scale directly displaying the numerical value of the measured weight of the user standing on it. For a weight sensor, the value is a numerical value of the weight (in kg or lb); for an impedance sensor, the value is a numerical value of the fat mass or the fat percentage; for a nerve health sensor, the value is a numerical value of a nerve health score.

In the obfuscated mode, the display device 150 is configured to display some information related to the measurement data. By "some information related to the measurement data", it is understood that the displayed information is different from the numerical value of the measurement data. In an implementation, the information related to the measurement data of the user may be a color related to measurement data. For example, the color may be green if the measured weight is lower than a user target or if the body mass index (BMI) associated with the measured weight is in the "normal" range according to the Health World Organization (HWO), i.e. between 18.5 and 24.9. The color may be orange if the measured weight is close to the user target, for example between 2 kg and 5 kg above the target or if the BMI is in the "overweight" or "underweight (mild thinness)" range according to the HWO, i.e. between 25.0 and 24.9 or 17.0 and 18.4. The color may be red if the measured weight is distant to the user target, for example more than 5 kg above the target or if the BMI is in the "obese" or "underweight (moderate and severe thinness)" range, i.e. above 30 or under 17. In an implementation, the information related to the measurement data of the user may be a symbol related to the measurement data. The symbol is for example an emoji. For example, the symbol may be a smiling emoji or a sad emoji in function of the measured weight relatively to a user target or in function of the associated BMI. In an implementation, the information related to the measurement data of the user may be a non-alphanumerical indication.

In an implementation, the information related to the measurement data of the user may be a trend of the measurement data. The trend considers the history of the measurements carried out by the user. The information is then representative of the trend of this measurement data history. The trend is for example a numerical value of the difference between previous measurement data, or an arrow pointing up or down in function of the slope of the trend. In a variant, the trend may be displayed as a color, for example green when the weight has decreased on the last week or red when the weight has significantly increased during the last week.

In the hidden mode, the display device 150 is configured not to display any information related to the measurement data of the user. In other words, in this embodiment, the display device 150 does not display any information from which the user could extract information related to his/her weight. It is understood that, in the hidden mode, the display device 150 does not display any information related to the weight, which also include BMI, body fat composition, etc.

Alternatively, or in addition, the display device 150 is configured to display a trend of the physiological state of the user, the trend being computed using the measurement data. The trend takes into account a history of measurement data of the user. For example, the trend compares at least two measurement data, among which one was obtained before the current measurement. For example, the trend compares a plurality of measurement data, which were previously acquired, and the measurement data which were just generated. In the visible mode, the display device 150 is configured to display the numerical value of the trend of the measurement data (for example the difference between the numerical value of previous measurement data, or the difference with an average of a rolling-window). In the obfuscated mode, the display device 150 is configured to display some information related to the trend of the measurement data. The above description for the information related to the measurement data applies here: color (green if the weigh has decreased, respectively increased, red if the weigh has increased, respectively decreased, etc.) smiley may be used, but also a curve showing a negative or positive slope. In the hidden mode, the display device 150 is configured not to display any information related to the trend of the measurement data of the user.

The weighing system 100 may be configured to send the measurement data in any display mode to the external device 230. This enables to store the history of the measurements and enables the user to access them later if he/she wants. For example, the user may activate the hidden mode but a month later, the user may want to see the value of the hidden measurement data. As the measurement data was sent and stored in the external device 230, and notably in the server 230a, he/she may have access easily to its measurement data. The storing of the history of the measurements enables also to determine the trend which may communicated to the user.

Description of the Operation of the Weighing System

A method of displaying a measure associated with physiological state of the user, in particular the weight, with the weighing system 100 according to the pattern embodiment will now be described, in reference to FIG. 8, using an illustrative example. In the illustrative example, the configuration data are load configuration data and the predetermined patterns correspond to a "left foot first" pattern and a "right foot first" pattern. The "left foot first" pattern is associated with the "visible mode" display mode (described above) and the "right foot first" pattern is associated with the "obfuscated mode" display mode (described above).

Figure 8:
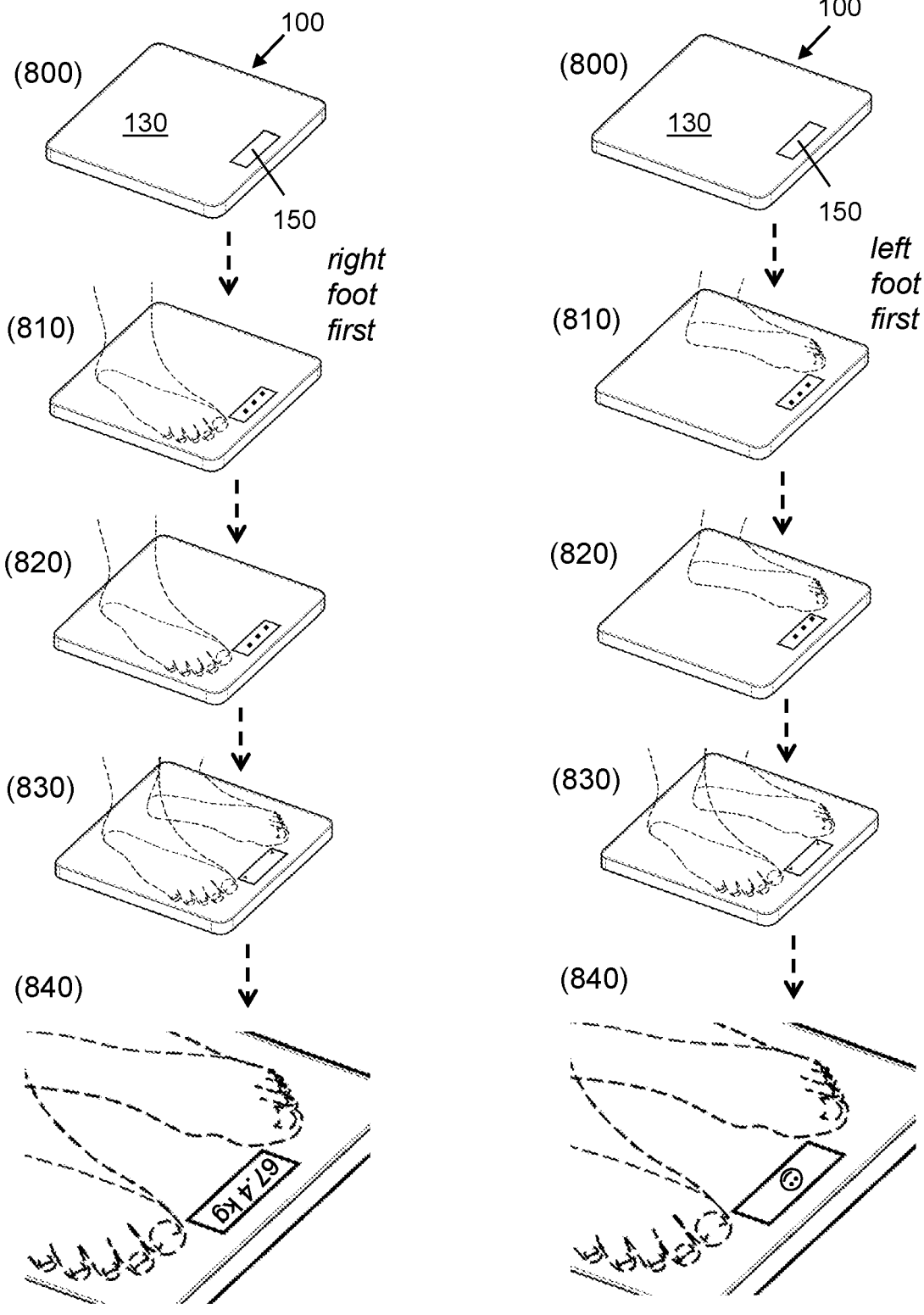
FIG. 8 shows two branches of a method of displaying a physiological property with the weighing system of FIG. 1, according to an aspect of the description.

Initially, at step 800, the display device 150 is in the standby mode and nothing is displayed by the display device 150, as illustrated on FIG. 8. More generally, the weighing system is in a standby mode.

Then, at step 810, the sensor device 240 generates the configuration data during the configuration period as the user starts interacting with the weighing system. In particular, the user steps on the weighing system 100 with a chosen foot—the right foot in the following example.

In the right foot first branch of FIG. 8, because the user steps on the upper plate 140 with the right foot first, the sensor device generates at step 810 configuration data during the configuration period. Therefore, at step 820, the control circuitry 210 identifies a load pattern (here a load dissymmetry called "right foot first" pattern) in the configuration data and selects the display mode associated with the identified load pattern. In this example, the associated display mode is thus the visible mode.

In the left foot first branch of FIG. 8, because the user steps on the upper plate with the left foot first, a "left foot first pattern" is identified by the control circuitry 210 and the display mode associated with the pattern would have been selected by the control circuitry 210. Therefore, at step 820, the control circuitry 210 identifies a load pattern (here a load dissymmetry called "left foot first" pattern) in the configuration data and selects the display mode associated with the identified load pattern. In this example, the associated display mode is thus the obfuscated mode.

After the configuration period, the user brings his or her other foot on the upper plate 130, the user has his or her two feet on the weighing system 100 and the sensor device 240 generates, at step 830, the measurement data during the measurement period. In particular, the sensor device 240 may measure the weight of the user.

The display device 150 may display an indicator of the dissymmetry of the loads applied on the upper plate 130 and thus the lad sensor to enable a better weigh measurement. The indicator is here two arrows pointing in the direction of the user indicating that the user needs to lean forward.

Then, at step 840, the display device 150 applies the selected display mode (the selection was made at step 830) applied to the measurement data during a measurement display period.

In the left foot first branch, the display device 150 applies the visible mode as selected by the control circuitry 210 at step 830 because the user stepped with the right foot first on the weighing system 100. As illustrated on FIG. 8, the display device 150 displays directly the numerical value of the measured weight, here "67.4 kg".

In the right foot first branch, the display, the display device 150 applies the obfuscated mode as selected by the control circuitry 210 at step 830 because the user stepped with the left foot first on the weighing system 100. As illustrated on FIG. 8, the display device 150 displays for example a smiling smiley if the measured weight is under a user weight target. For example, the user may have registered a weight target of 67.5 kg and the measured weight is 67.4 kg.

Customization of the Display Mode

A customization feature of the display modes with now be described. This customization applies to all the embodiments of the description.

Referring again to FIG. 2, the control circuitry 210 is configured to communicate with the external device 230. In this embodiment, the external device 230 is a personal external device 230 that the users may easily have (e.g., a smartphone, a tablet, or even a personal computer such as a laptop).

The control circuitry 210 may be configured to receive from the external device 230 customization data to personalize the experience with the weighing system.

The customization data may include any of: mode data to modify the available display modes, pattern data to change the predetermined patterns, association data to change the association between the predetermined patterns and the available display modes, preference data to switch between the pattern embodiment and the configuration interface embodiment, activation data to selectively activate or deactivate the configuration period and to select a default display mode when the configuration period is deactivated.

Mode Data

For example, the user may choose on the external device 230*b* (on an app for example) that the available display modes he or she wishes to have on the weighing system 100. This choice generates customization data with mode data and the external device 230*b* is configured to send the customization data to the control circuitry 210 of the weighing system 100. For example, if the two display modes initially available for the display device 150 are the visible mode and the hidden mode, and if the user does not want to see anymore his or her weight, he or she may select in the app that he or she wants the obfuscated mode and the hidden mode to be available. The control circuitry 210 is configured to receive the customization data and to modify the available display modes for the display device 150 to the obfuscated mode and the hidden mode. This way, with the example of the first embodiment, depending on the foot with which the user steps on the upper plate, the display device applies the obfuscated mode or the hidden mode, but no longer the visible mode.

Pattern Data

For example, the user may choose on the external device 230*b* (on an app for example) the predetermined patterns that he or she wants to execute on the weighing system 100, for example among a list of predetermined patterns. This choice generates customization data with pattern data and the external device 230*b* is configured to send the customization data to the control circuitry 210 of the weighing system 100. The control circuitry 210 is configured to receive the customization data and to change, using those customization data, the predetermined patterns. For example, the user may want to predetermined patterns to be a temporal distribution of the configuration data rather than a spatial distribution of the configuration data.

Association Data

For example, the user may choose on the external device 203*b* (on an app for example) the predetermined pattern he or she wishes to associate to each display mode. This generates customization data with association data and the mobile terminal 230*b* is configured to send the customization data to the control circuitry 210 of the weighing system 100 The control circuitry 210 is configured to receive the customization data and to change, using those customization data, the association between predetermined patterns and display modes. For example, if initially stepping on the weighing system 100 with the left foot is associated with the visible mode and stepping with the right foot is associated with the hidden mode, the user may want to swap these two predetermined patterns. The user may therefore change the settings in an app of his or her external terminal 230*b* so that stepping on the weighing system 100 with the left foot is now associated with the hidden mode and stepping with the right foot is associated with the visible mode.

Preference Data

For example, the user may choose on the external device 230*b* (on an app for example) that he prefers the configuration interface embodiment over the pattern embodiment. This choice generates customization data with preference data and the external device 230*b* is configured to send the customization data to the control circuitry 210 of the weighing system 100.

Activation Data

The control circuitry 210 may be configured to receive from the external device 230 activation data to selectively activate or deactivate the configuration period and to select a default display mode when the configuration period is deactivated. In other words, the user may want to temporarily disable the pattern recognition and may want to use always the same display mode. For example, the user may start new life and food habits and want to record his or her weight regularly but without seeing it during the first weeks. The user may therefore deactivate the configuration period and choose the weighing system to be temporarily always in hidden mode so as not to be discourage by seeing his or her weight. After two weeks, the user may want to see the first results and may reactivate the configuration period.

The "Are You Sure" Option

After the display mode has applied the selected display mode the measurement data (for example the hidden mode), the user may change his or her mind and want to see his or her measurement data.

The control circuitry 210 may be configured to carry out, after the measurement display period, an additional configuration period. In particular, the control circuitry 210 is configured to carry out the additional configuration period when the display mode is the hidden mode or in the obfuscated mode.

The control circuitry 210 is configured to select a display mode for the display device 150 based on additional configuration data generated during the additional configuration period.

In particular, the control circuitry 210 is configured to control the display mode of the display device 150 based on a pattern of loads detected by the sensor device 240 during the additional configuration period. When a user selects the hidden mode or the obfuscated mode during the initial configuration period, he/she may change his mind after the measurement data and may want to see afterwards the numerical value of the measurement data.

In a variant, the display device 150 may be configured to display a configuration interface as previously described during the additional configuration period. As illustrated on FIG. 8, the configuration display is representative of the available display modes. The selection of the display mode may be made by the user by moving its center of mass to the right or to the left. This may lead to an arrow pointing the selected display mode as illustrated on FIG. 8.

The control circuitry 210 is then configured to select the chosen display mode among the plurality of display modes based on the identification of a pattern during the additional configuration period.

Figure 9:
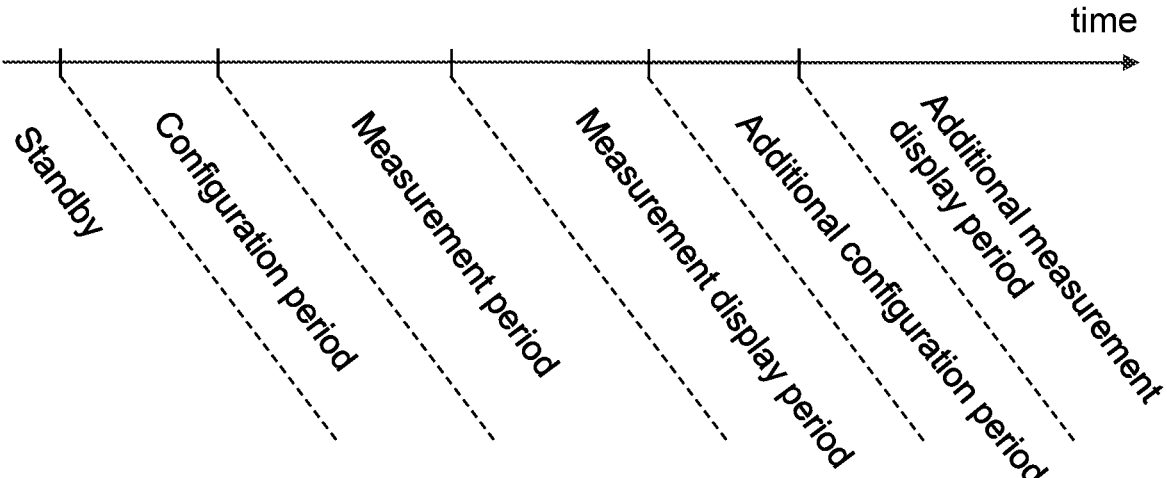
FIG. 9 shows a schematic timeline of an operation of the weighing system of FIG. 1 according to another embodiment of the description.

The display device 150 is then configured to apply the selected display mode applied to the measurement data. The display mode is operated during an additional measurement display period following the additional configuration period, as illustrated on FIG. 9.

As an example, a user may come back from vacation and prefers not to see his/her weight. Therefore, he/she activates the obfuscated mode during the configuration period. The display device 150 then displays a smiling emoji indicating that the measured weight is in accordance with the user target. The user may eventually want to see the numerical value of his/her weight and activates the visible mode during the additional configuration period. Then, the display device 150 displays the weight according to the selected visible mode.

Customization Based on the User Profile

Figure 10:
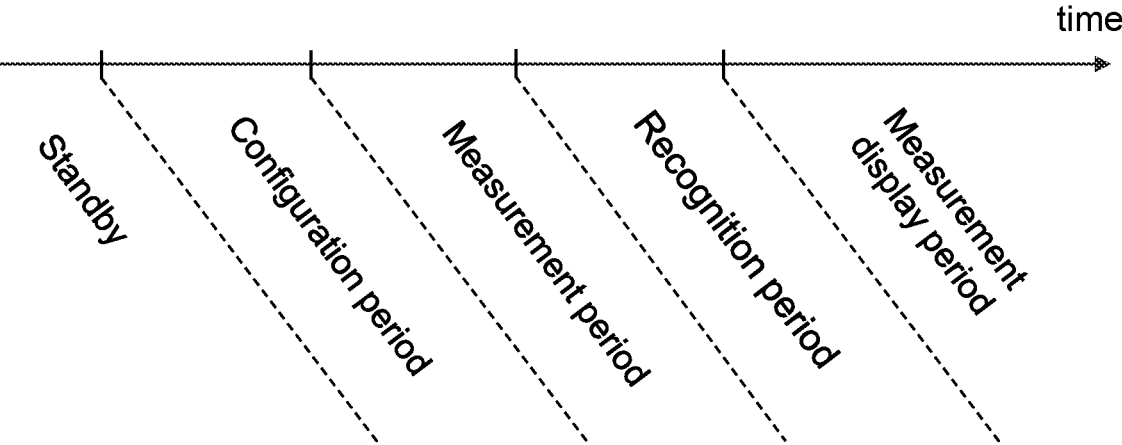
FIG. 10 shows a schematic timeline of an operation of the weighing system of FIG. 1 according to another embodiment of the description.

This time, in relation to FIG. 10, the experience may vary based on the user recognized the weighing system.

The control circuitry 210 may be configured to receive from the external device 230 and to store at least a user profile associated with a user of the weighing system 100. In particular, a plurality of user profiles may be stored in the control circuitry 210. As indicated above, the user profile typically includes a heigh of the user, the sex of the user and, potentially, the age of the user.

In an implementation, the customization data are linked to a user profile. Therefore, in the weighing system 100, the available display modes and, in the relevant embodiment, their association with a predetermined pattern depends on the user profile.

The control circuitry 210 is configured to detect a specific user standing on the weighing system 100 among the plurality of user profiles during a recognition period and to select his or her user profile. As illustrated on FIG. 10, the recognition period follows the configuration period. In particular, the recognition period also follows the measurement period. The control circuitry 210 may recognize the specific user based on the measured weight and a weight linked to a user profile (e.g., by comparing the measured weigh and the linked weigh of the user profiles).

The display device 150 is configured not to display any information representative of the measurement data of the user during the recognition period (neither a numerical value nor any information allowing the user to get some information about his or her measurement data). The display device 150 may configured to display some information not related to any user during the configuration period and/or the recognition period, for example a weather information.

The control circuitry 210 is configured to select a display mode based on the configuration data and based on a user profile. In other words, the selection of a display mode by the control circuitry 210 may depend on the pattern the user carries out while stepping on the weighing system 100 and on his/her user profile. For example, user A may want the hidden mode when stepping with the right foot first and user B may want the hidden mode when stepping with the left foot first. Thanks to the recognition period, the control circuitry is able to recognize the user and to select his or her user profile and to apply the appropriate display mode associated with the appropriate predetermined pattern.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. A weighing system comprising:

a sensor device configured to generate configuration data during a configuration period and to generate measurement data during a measurement period, the measurement data being representative of a physiological state of a user, control circuitry configured to select a display mode among a plurality of available display modes, the selection being based at least on a measurement, performed during the configuration period, of a physical property relative to the user over space and/or over time in the configuration data, and a display device configured to apply the selected display mode to the measurement data during a measurement display period, the measurement display period following the configuration period.

2. The weighing system according to claim 1, wherein the measurement of the physical property relative to the user over space that forms at least part of the configuration data corresponds to a spatial distribution of measured values of the physical property during the configuration period, and wherein the measurement of the physical property relative to the user over time that forms at least part of the configuration data corresponds to a temporal distribution of the measured values of the physical property during the configuration period.

3. A weighing system comprising:

a sensor device configured to generate configuration data during a configuration period and to generate measurement data during a measurement period, the measurement data being representative of a physiological state of a user, control circuitry configured to select a display mode among a plurality of available display modes, the selection being based at least on the configuration data, and a display device configured to apply the selected display mode to the measurement data during a measurement display period, the measurement display period following the configuration period, wherein the control circuitry is configured to awaken the display device from a standby state when the sensor device detects a load greater than a predetermined awakening threshold for a predetermined awakening duration, the configuration period starting after each awakening of the display device from the standby state.

4. A weighing system comprising:

a sensor device configured to generate configuration data during a configuration period and to generate measurement data during a measurement period, the measurement data being representative of a physiological state of a user, control circuitry configured to select a display mode among a plurality of available display modes, the selection being based at least on the configuration data, and a display device configured to apply the selected display mode to the measurement data during a measurement display period, the measurement display period following the configuration period, wherein the sensor device comprises a load sensor, wherein the load sensor is configured to generate the configuration data and the measurement data.

5. The weighing system according to claim 1, wherein the selection is based at least on an identification in the configuration data of a pattern amongst a plurality of predetermined patterns associated with the plurality of available display modes.

6. The weighing system according to claim 5, wherein the predetermined patterns include a spatial distribution of the configuration data.

7. The weighing system according to claim 5, wherein the predetermined patterns include a spatial dissymmetry of the configuration data, wherein the spatial dissymmetry being optionally representative of a user stepping on the weighing system with the left foot first or the right foot first.

8. The weighing system according to claim 7, wherein the sensor device comprises a plurality of load sensors, each load sensor being configured to measure an associated load, wherein the spatial dissymmetry includes the detection by half or fewer of the load sensors of a load greater than a first predetermined threshold, the other half or more of the load sensors detecting a load lower than a second predetermined threshold.

9. The weighing system according to claim 5, wherein the predetermined patterns include a temporal distribution of the configuration data.

10. The weighing system according to claim 5, wherein the control circuitry is configured to receive from an external device customization data comprising at least one of:

association data to change the associations between the plurality of predetermined patterns and the plurality of display modes, pattern data to change the predetermined patterns.

11. The weighing system according to claim 1, wherein the configuration data include:

load data, and/or bioimpedance data.

12. The weighing system according to claim 1, wherein the available display modes are chosen among:

a visible mode in which the display device is configured to display a numerical value of the measurement data, an obfuscated mode in which the display device is configured to display some information related to the measurement data, a hidden mode in which the display device is configured to not display any information representative of the measurement data.

13. The weighing system according to claim 1, wherein the display device is further configured to display a configuration interface at the beginning of the configuration period, wherein the configuration interface is representative of the available display modes, the selected display mode being chosen during the configuration period with the configuration data.

14. The weighing system according to claim 1, wherein the control circuitry is configured to receive from an external device customization data comprising mode data to change the available display modes.

15. The weighing system according to claim 1, wherein the control circuitry is configured to store a user profile associated with each user of the weighing system, the user profile including notably a height of the user and the sex of the user.

16. The weighing system according to claim 15, wherein the control circuitry is configured to select a display mode among the plurality of display modes of the display device based on the configuration data and on a user profile.

17. The weighing system according to claim 15, wherein each user profile defines the plurality of available display modes, wherein the user profile further defines the association between the plurality of predetermined patterns and the plurality of available display modes.

18. The weighing system according to claim 15, wherein the control circuitry stores a plurality of user profiles, the control circuitry being configured to detect, during a recognition period, a specific user standing on the weighing system and to select the associated user profile.

19. A method of display carried out by a weighing system according to claim 1, the method comprising:

generating configuration data during a configuration period, generating measurement data during a measurement period, the measurement data being representative of a physiological state of the user, selecting a display mode among a plurality of available display modes, the selection being based at least on the configuration data, and applying the selected display mode to the measurement data during a measurement display period, the measurement display period following the configuration period.

20. A non-transitory computer-readable medium including computer readable instructions which, when executed by a computer, carry out a method of display according to claim 19.

* * * * *